2a NEUTRON FLUX FROM SOURCE
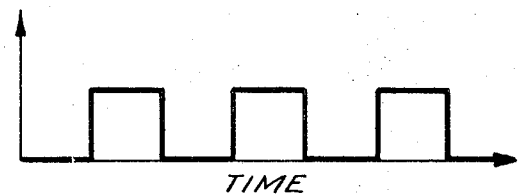
2b IN PHASE DETECTOR SIGNAL (NON-POROUS FORMATION)
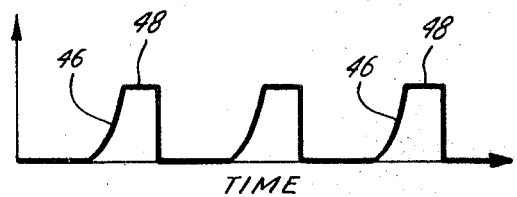
2c IN PHASE DETECTOR SIGNAL (POROUS FORMATION)
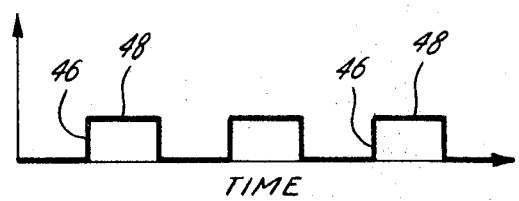
2d OUT OF PHASE DETECTOR SIGNAL (POROUS FORMATION CHLORINE HIGH)
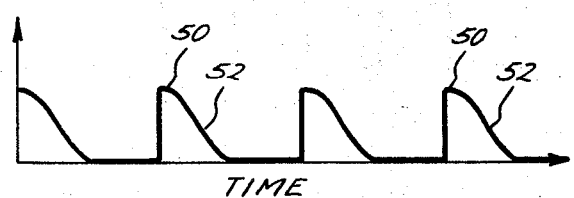
2e OUT OF PHASE DETECTOR SIGNAL (POROUS FORMATION CHLORINE LOW)
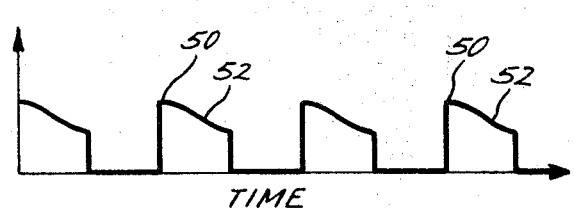
2f OUT OF PHASE DETECTOR SIGNAL (NON-POROUS FORMATION)
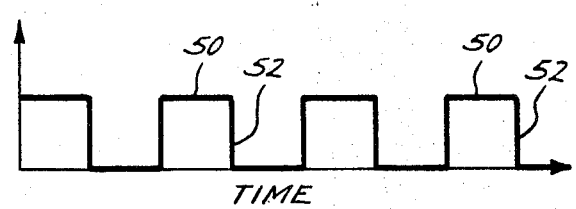
Fig. 2

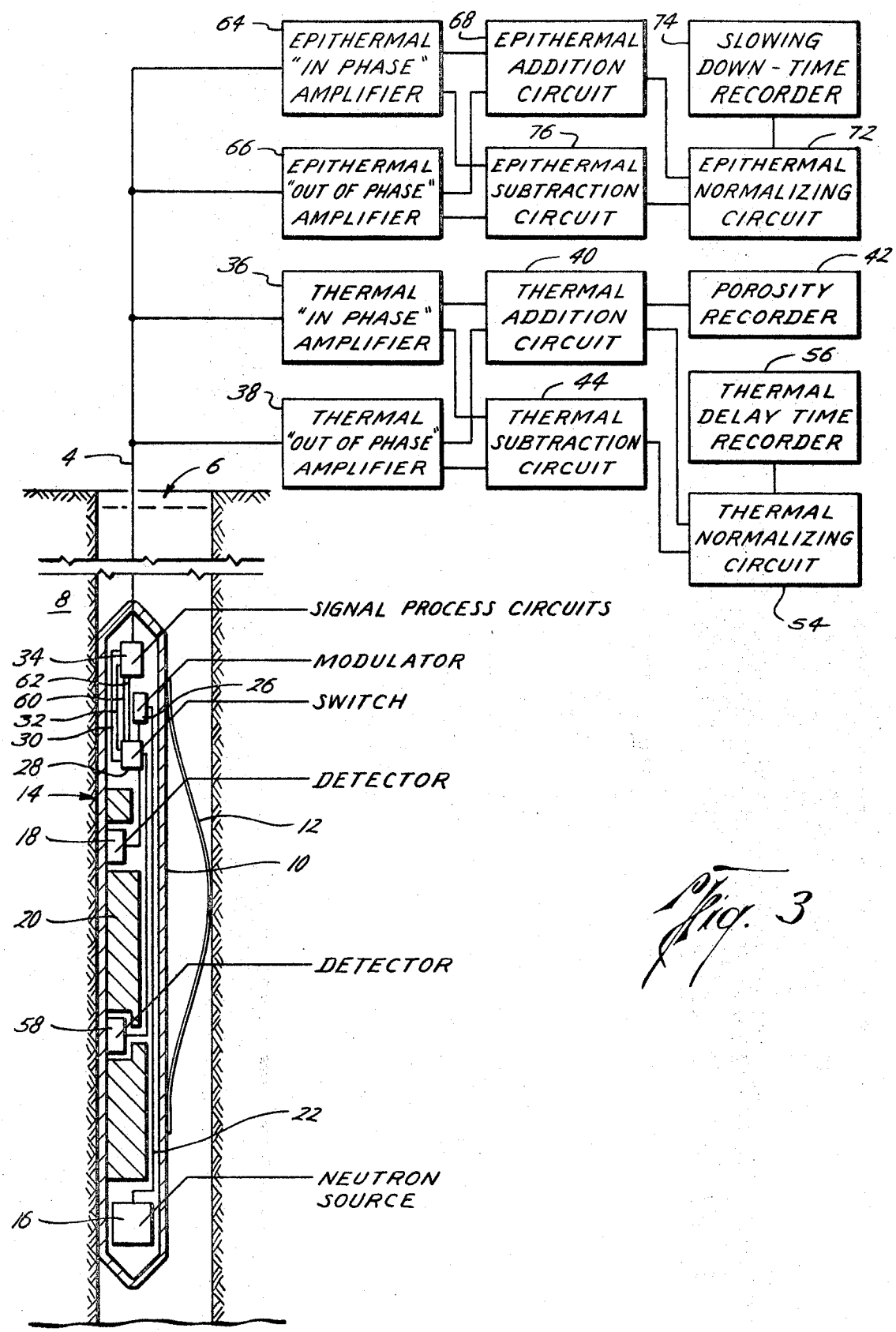

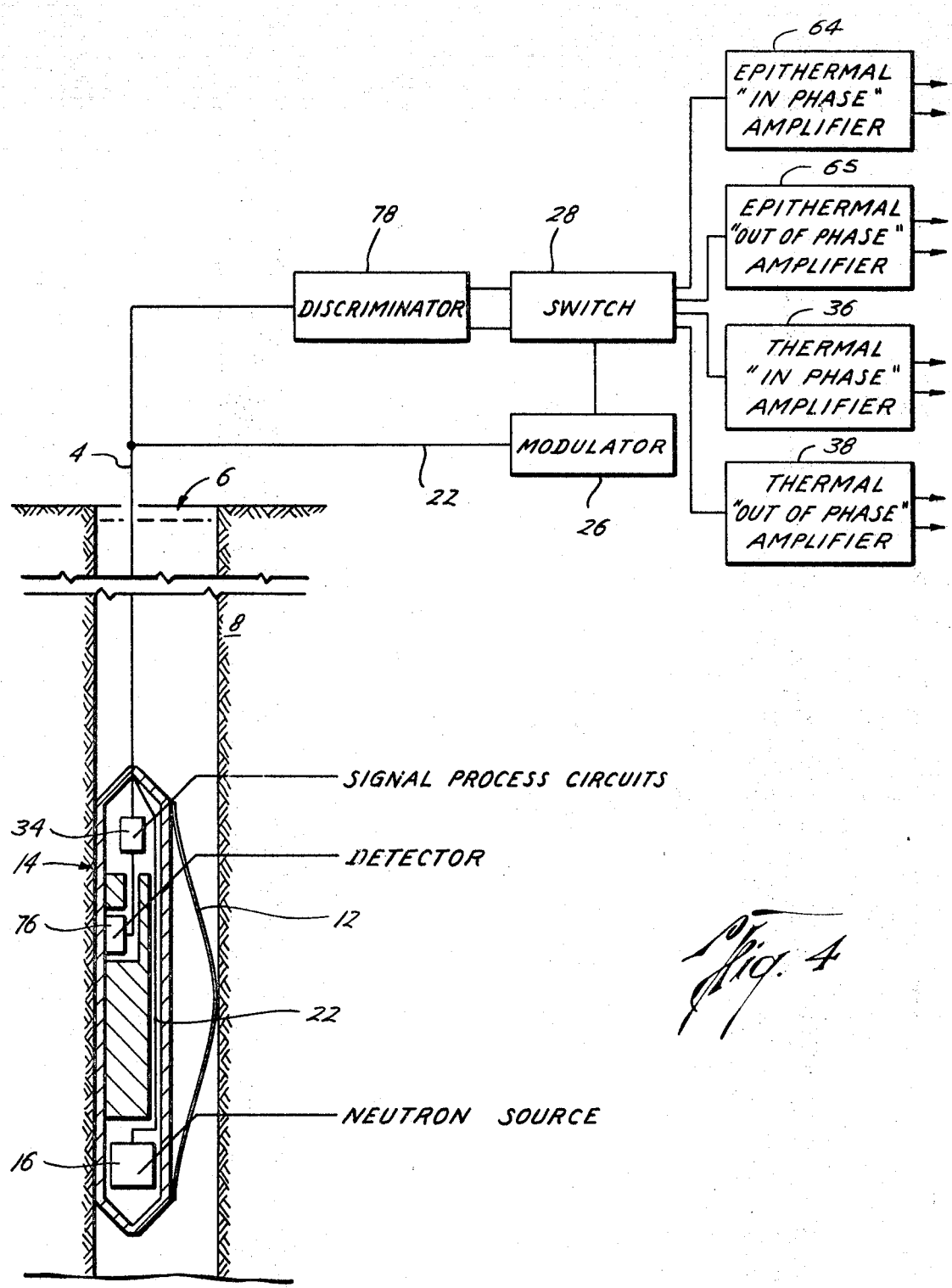

United States Patent Office

3,529,160
Patented Sept. 15, 1970

---

3,529,160
METHOD AND APPARATUS FOR SIMULTANEOUS POROSITY AND CHLORINITY LOGGING
James H. Moran, Danbury, Conn., assignor to Schlumberger Technology Corporation, Houston, Tex., a corporation of Texas
Filed May 10, 1967, Ser. No. 637,548
Int. Cl. G01v 5/00
U.S. Cl. 250—83.1                      12 Claims

ABSTRACT OF THE DISCLOSURE

One embodiment of the invention shows a well logging tool that contains a source for emitting neutron pulses of of equal duration and spacing. An epithermal or thermal and epithermal neutron detector signal registered during each pulse is added to a detector signal registered between each pulse in order to produce an indication of formation porosity. The difference between these detector signals is divided by the detector signal sum to provide a normalized log of thermal neutron decay time that characterizes the chlorine concentration in the formation. The technique also can be applied to measure epithermal or thermal and epithermal neutron slowing down time. The neutron population, moreover, can be measured through the gamma radiation that results from neutron interaction with the nuclear structure of the earth formation.

---

This invention relates to nuclear well logging and is particularly directed to novel methods and apparatus for nuclear well logging which permit simultaneous measurements of the porosity and chlorinity of the formations surrounding a borehole.

In determining information concerning the subsurface formations surrounding boreholes, such as oil wells, two of the most important criteria are porosity and chlorinity. Obviously, porosity is important since gas, oil, or water can only be contained in porous formations. Chlorinity is important since the amount of chlorine present in a porous formation indicates whether the formation contains salt water or is a likely source of oil, gas, or fresh water. Numerous methods and apparatus have been proposed heretofore for measuring these factors. Moreover, since the development of borehole accelerators which permit irradiation of the formations with high-energy neutrons, various methods and apparatus employing such accelerators have been proposed for obtaining information concerning the formations surrounding the borehole. However, most of the prior art techniques have required accelerators which could emit neutron bursts or pulses of extremely short duration, generally of the order of a few microseconds. Such techniques place severe requirements on the accelerators and greatly increase the cost, complexity, and fragility of the accelerators. Moreover, the electronic circuitry required for such techniques is highly complex. Consequently, the cost of the apparatus necessary for such techniques has been high.

These disadvantages of the prior art are overcome with the present invention and novel methods and apparatus for nuclear well logging are provided which permit porosity and chlorinity logs to be made simultaneously while employing apparatus which is rugged in construction, simple in circuitry, and relatively inexpensive to produce.

The advantages of the present invention are preferably attained by providing novel methods and apparatus for nuclear well logging wherein the formations surrounding the borehole are irradiated with high-energy neutrons from a source which is turned "ON" for a period which is substantially longer than the time required for the rate of neutron emission from source to reach an equilibrium condition and which is turned "OFF" for an equally long period. Thermal neutrons or capture gamma rays are detected during the entire cycle or during portions of the OFF and ON periods. However, the detector is modulated to send signals to one signal channel during the period when the source is turned ON and to send signals to a second signal channel during the period when the source is turned OFF. The signals in the second channel are added to those of the first channel to provide a porosity log and in another operation are substracted from the signals of the first channel. The difference is then divided by the sum to provide a log of thermal neutron decay time which indicates the chlorinity of the formations.

In another embodiment of the invention a second detector is provided which measures epithermal neutrons. The second detector is modulated, in the same manner as the thermal neutron detector, to provide signals for two additional signal channels, and sum and difference of these signals are normalized to provide an indication of the slowing-down time of the formations. This serves to provide and indication of the hydrogen content in formations of low porosity.

Accordingly, it is an object of the present invention to provide novel methods and apparatus for nuclear well logging.

Another object of the present invention is to provide novel methods and apparatus for simultaneously measuring the porosity and chlorinity of formations surrounding a borehole.

A further object of the present invention is to provide novel apparatus for simultaneously measuring the porosity and chlorinity of formations surrounding a borehole, which apparatus is rugged in construction, simple in circuitry, and relatively inexpensive to produce.

A specific object of the present invention is to provide novel methods and apparatus for nuclear well logging whereby the formations surounding the borehole are irradiated with high-energy neutrons from a source. Thermal neutrons or capture gamma rays are detected during the entire cycle with a detector which is modulated to provide signals to a first signal channel while the source is turned ON and to a second signal channel when the source is turned OFF. The signals in the two channels are added to provide a porosity log and in a separate operation are subtracted. The sum and difference are then normalized to provide an indication of the thermal neutron decay time which indicates the chlorinity of the formations.

Another specific object of the present invention is to provide novel methods and apparatus for nuclear well logging whereby an epithermal neutron detector is employed and is modulated to provide signals for two signal channels which may be normalized to provide an indication of the slowing-down time of the formations as an indication of the hydrogen index information of low porosity.

These and other objects and features of the present invention will be apparent from the following detailed description taken with reference to the figures of the accompanying drawings.

In the drawings:

FIGS. 2a–2f are diagrammatic representations of the modulation schedule for the apparatus of FIG. 1;

FIG. 3 is a diagrammatic representation of a modified form of the apparatus of FIG. 1; and FIG. 4 is a diagrammatic representation of a further modified form of the aparatus of FIG. 1.

Figure 1:
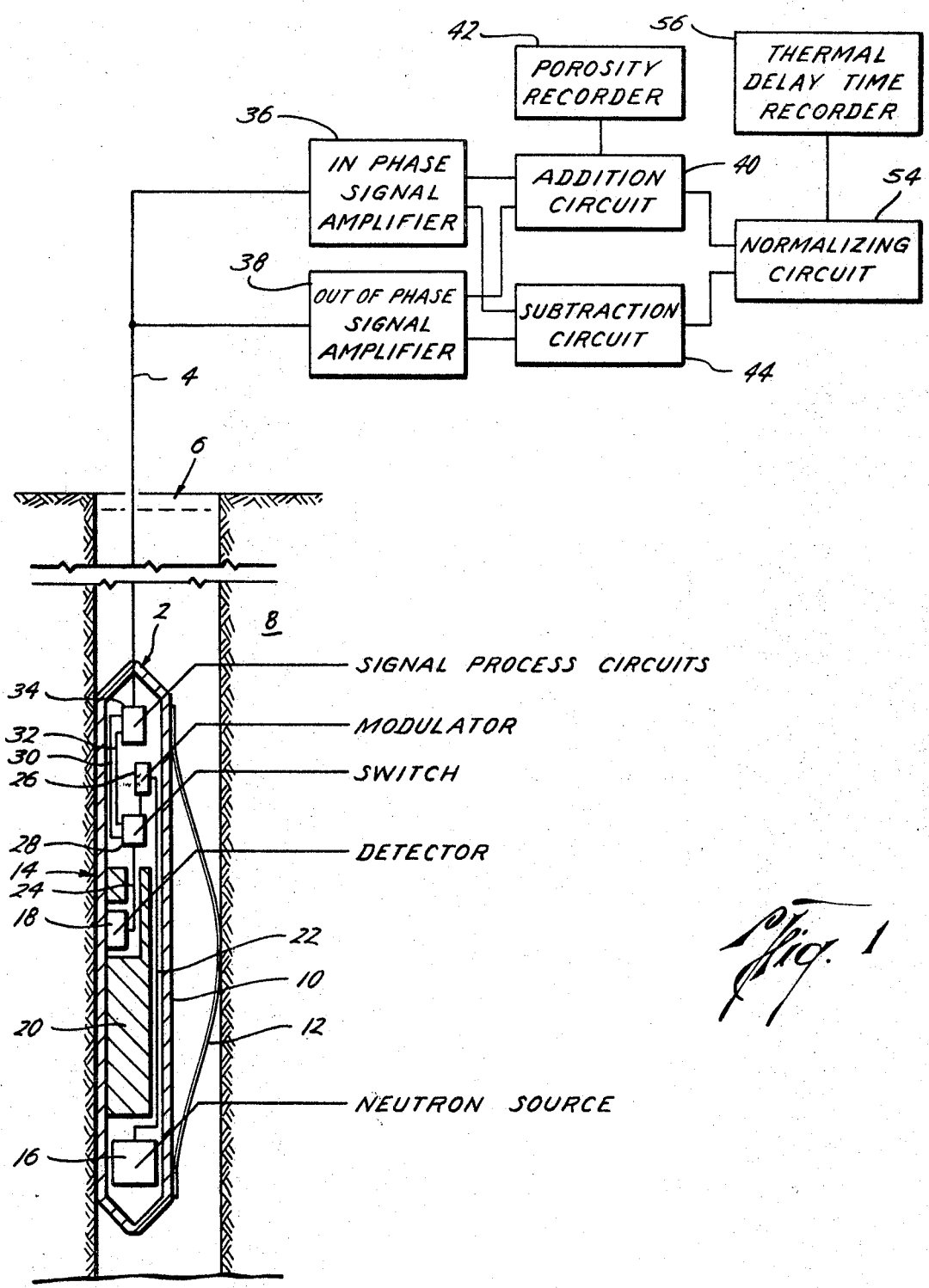
FIG. 1 is a diagrammatic representation of apparatus for nuclear well logging embodying the present invention.

In the forms of the present invention chosen for purposes of illustration in the drawings, FIG. 1 shows subsurface instrument 2 suspended by means of a cable 4 in a borehole 6 which penetrates the earth 8. The borehole 6 may be cased or uncased and may be empty, as shown, or may be filled with fluid, such as drilling mud, oil, water, or the like. Cable 4 serves to raise and lower the instrument 2 in the borehole and also provides electrical connections between the instrument 2 and the surface equipment. This is conventional in the well logging art and a detailed description is believed to be unnecessary.

The subsurface instrument 2 comprises a pressure-resistant housing 10 and is provided with means, such as bow spring 12, for urging one side 14 of the instrument 2 into engagement with the wall of the borehole 6. Within the instrument 2 is a source 16 of high-energy neutrons. The neutron source 16 must be capable of being turned ON and OFF so as to irradiate the formations surrounding the borehole with high-energy neutrons during alternate periods, as indicated in FIG. 2a. The frequency of the cycle of operation is such that the neutron source 16 is turned ON for a period which is substantially longer than the time required for source 16 to reach an equilibrium condition and is turned OFF for a period of equal time. Timing cycles wherein the source 16 is turned ON for 100 microseconds or more and OFF for an equal period have been found satisfactory. An accelerator-type neutron source, such as that disclosed in U.S. Pat. No. 2,991,364, issued July 4, 1961, to Clark Goodman and assigned to the present assignee, is quite satisfactory for the purposes of the present invention. Neutron sources of this type normally emit 14 million-electron-volt neutrons by means of the deuterium-tritium reaction. However, for purposes of the present invention, it is only necessary that the neutrons emitted by source 16 have energies above the thermal energy of the formations surrounding the borehole. A thermal neutron detector 18 is mounted in the instrument 2 adjacent the borehole wall engaging side 14 of the instrument 2 and is spaced a relatively long distance, of the order of 15 inches or more, from the neutron source 16. Suitable shielding material 20, such as boron, paraffin, or the like, which is substantially opaque to neutrons, is provided about the detector 18 on all sides except that adjacent side 14 of the instrument 2 and substantially fills the space between the detector 18 and neutron source 16. Suitable channels 22 and 24 are formed in the shielding material 20 to provide conduits for electrical connections to the source 16 and detector 18.

As indicated above, the advantages of the present invention can be obtained by detecting either thermal neutrons or capture gamma rays. Obviously, if capture gamma rays are to be detected, a gamma-ray detector would be substituted for the thermal neutron detector 18 of FIG. 1 and appropriate shielding material, such as lead, which is opaque to gamma rays would be disposed about the detector on all sides except adjacent side 14 of the instrument 2 to cause the detector to be preferentially sensitive in the direction of side 14 of the instrument 2. Such substitutions and the changes in the electronic portions of the apparatus which would be required by such substitutions are well within the skill of those versed in the art.

A suitable modulating device 26, such as a square-wave generator, is provided and may be located either in the subsurface instrument 2, as shown, or in the surface equipment. The modulator 26 supplies signals to neutron source 16 to turn the source 16 ON and OFF in a predetermined manner, as indicated in FIG. 2a. As indicated above, source 16 operates on a time cycle whereby it is turned ON for one-half of the time cycle and is turned OFF for the other half of the time cycle. Modulator 26 also provides signals to a switching circuit 28 which is connected to receive signals from detector 18 and which serves to supply these signals to a first signal channel, indicated by conductor 30 during the first half of the timing cycle of modulator 26, and to supply the signals to a second signal channel, indicated by conductor 32 during the second half of the timing cycle. Thus, conductor 30 receives those signals from detector 18 which are "inphase" with the "ON" period of source 16 as indicated in FIGS. 2b and 2c, while conductor 32 receives those signals which are "out-of-phase" with source 16, as indicated in FIGS. 2e and 2f. Conductors 30 and 32 pass their signals to suitable signal-processing circuits 34 where the signals are prepared for ttransmission and are applied to the cable 4 to be sent to the surface equipment. The signal-processing circuits 34 may include amplifiers, signal-shaping circuits, blocking oscillator circuits, and other conventional circuitry, as is well-known in the art. If desired, the signals from detector 18 may be supplied directly to the signal-processing circuits 34, and switching circuit 28 may be included in the surface equipment.

With the apparatus thus far described, the neutron source 16 irradiates the formations surrounding the borehole with high-energy neutrons. The time required for most accelerator-type neutron sources to reach equilibrium, so that they emit neutrons at a constant rate, is generally only about a microsecond. Consequently, because of the relatively long-time cycle employed in the method of the present invention (equal "ON"-"OFF" periods of 100 microseconds or more), this time can safely be ignored.

Most of the presently available accelerator-type neutron sources emit neutrons as a result of the deuterium-tritium reaction with energies of 14 million electron volts. These neutrons gradually lose energy, due to elastic and inelastic collisions with atoms of the various elements composing the formations, until they reach the thermal energy level—about 1 electron volt. Therefore, the neutrons emitted by the source 16 will not reach the thermal energy level until some time—several microseconds—after they are emitted by the source 16. Moreover, the rate at which any given neutron loses tis energy depends upon the number of collisions it undergoes and whether the respective collisions are elastic or inelastic. Consequently, curves, such as those of FIGS. 2b and 2c, showing the counting rate supplied by detector 18 to conductor 30 during the "inphase" portion of the cycle while source 16 is turned ON, will show a gradual increase at first, as indicated by portions 46 of the curves of FIGS. 2b and 2c.

As is well-known, collisions between neutrons and hydrogen nuclei will be primarily elastic, resulting in rapid loss of energy for the neutrons. Furthermore, since the pores of all porous subsurface formations are filled with either oil, gas, or water, each containing a large proportion of hydrogen, the rate at which neutrons emitted by source 16 lose energy and arrive at the thermal energy level will be almost instantaneous where porous formations are encountered, as indicated by portions 46 of the curves of FIG. 2c, but will be much slower where nonporous formations are encountered, as shown by the slopes of the portions 46 of the curves of FIG. 2b. The time required for the neutrons emitted by the source 16 to lose energy down to the thermal energy is referred to as the "slowing-down time" of the formation. Since the source 16 emits neutrons at a constant rate, the rate at which neutrons arrive at the thermal energy level will also end to a constant value for any given formaion.

After the neutrons from source 16 have been slowed to the thermal energy level, they continue to travel through the formations until they are captured by the nuclei of the elements composing the formations. Since, upon capture, the neutrons actually become part of the capturing atom, it will be apparent that the number of neutrons or capture gamma rays available for detection will depend upon the rate at which the thermal neutrons are being captured, as well as the rate at which neutrons reach the thermal energy level. Thus, although the source 16 is emitting neutrons at a constant rate, the response of detector 18 will be a function of the difference between the rate of arrival of neutrons at the thermal energy level and the rate of capture of the thermal neutrons by the elements contained in the formations. In view of this, the portions 48 of the curves of FIGS. 2b and 2c will tend to become level as the source 16 reaches equilibrium, but may actually increase depending upon the relation between the rate of arrival of neutrons at the thermal energy level and the rate at which the thermal neutrons are captured.

The likelihood that a thermal neutron will interact with a nucleus of a particular element is proportional to the "thermal neutron-scattering cross section" of that element. Although the scattering cross section of hydrogen is only slightly greater than the cross sections of most other elements which are likely to be encountered in the formations surrounding a borehole, as indicated above, the pores of porous formations are filled with oil, gas, or water, all of which contain large proportions of hydrogen. Consequently, although the neutrons from source 16 arrive rapidly at the thermal energy level, in porous formations the thermal neutrons will also be scattered and captured relatively rapidly. Therefore, the number of thermal neutrons available for detection by detector 18 will be relatively low, as indicated by the area under the curves of FIG. 2c. In contrast, nonporous formations contain relatively little hydrogen and tend to absorb thermal neutrons more slowly. Consequently, the number of thermal neutrons available for detection by detector 18 will be relatively high, as shown by the area under the curves of FIG. 2b.

After a predetermined period, modulator 26 will turn OFF source 16 so that no additional neutrons will be emitted. At the same time, modulator 26 will cause switch 28 to switch the output of detector 18 from the "inphase" signal channel, connected through conductor 30, to the "out-of-phase" signal channel, connected through conductor 32. The "out-of-phase" signal from detector 18 is represented by the curves of FIGS. 2d, 2e, and 2f. Initially, the counting rate of the "out-of-phase" signal will be identical with that indicated by portion 48 of the "inphase" signal shown in FIGS. 2b and 2c, as seen by portions 50 of the curves of FIGS. 2d, 2e, and 2f. This is due to the time required for neutrons emitted by source 16 shortly before source 16 was turned OFF by modulator 26 to be slowed down to thermal energies and is comparable to the delay represented by portion 46 of the "inphase" signal curves of FIGS. 2b and 2c. Obviously, if desired, modulator 26 or switch 28 may be arranged to delay switching the output of detector 18 from "inphase" conductor 30 to "out-of-phase" conductor 32 until this delay time has elapsed.

As indicated above, thermal neutrons continue to be scattered through the formations until they are captured by atoms of the elements composing the formations, and since during the "out-of-phase" portion of the measuring cycle no additional neutrons are being supplied by source 16, it will be apparent that the number of neutrons available for detection, during the "out-of-phase" portion of the cycle, will depend directly upon the spatial distribution of the thermal neutrons and, hence, upon the rate at which thermal neutrons are scattered and captured by the elements contained in the formations surrounding the borehole. This is referred to as the "thermal neutron decay time" of the formation and is inversely related to the scattering cross section of the elements in the formation. Previously, it was noted that hydrogen has a slightly larger scattering cross section than most other elements contained in the formation and is present in large quantities in any porous formation. Consequently, the thermal decay time for porous formations will be substantially less than that of nonporous formations. For example, the decay time for a nonporous sandstone is approximately twice that of a 40% porous sandstone filled with oil or fresh water. In view of this, the signal supplied by detector 18 to conductor 32 during the "out-of-phase" portion of the measuring cycle will decline fairly rapidly in a porous formation, as indicated by portion 52 of the curves of FIGS. 2d and 2e, and will decline relatively slowly in a nonporous formation, as shown by portion 52 of the curves of FIG. 2f.

One element which will strongly affect the thermal decay time is chlorine which is usually present only in porous formations containing salt water. Chlorine has a capture cross section for thermal neutrons which is about 100 times larger than the cross sections of any of the other elements which are common in boreholes. Thus, even a slight change in the quantity of chlorine contained in the formation will cause a large change in the thermal neutron decay time. In a 40% porous limestone filled with water containing 15% salt by weight, the decay time will be much less than if the same rock were filled with fresh water or oil. This is illustrated by comparing the portions 52 of the curves of FIGS. 2d, 2e, and 2f.

As discussed in detail above, the "inphase" signal, supplied by detector 18 to conductor 30 when the source 16 is turned ON, will be relatively low for porous formations, as indicated in FIG. 2c, and will be relatively high for nonporous formations, as shown in FIG. 2b. In addition, the "out-of-phase" signal, supplied by detector 18 to conductor 32 when the source 16 is turned OFF, will be quite high for nonporous formations, as seen in FIG. 2f; moderate for porous formations containing oil, gas, or fresh water, as shown in FIG. 2e; and extremely low for porous formations containing salt water, as indicated in FIG. 2d. In view of this, it is possible, by appropriately combining the "inphase" and "out-of-phase" signals from detector 18, to provide simultaneous logs which will indicate the porosity and chlorinity of the formations surrounding the borehole.

At the surface of the earth the signals from detector 18, which are supplied to conductor 30, during the "inphase" portion of the timing cycle in which source 16 is turned ON, are supplied to the "inphase" signal amplifier 26, as shown in FIG. 1, while the signals from detector 18, which are supplied to conductor 32 during the "out-of-phase" portion of the timing cycle in which the source 16 is turned OFF, are supplied to the "out-of-phase" amplifier 38. If desired, amplifiers 36 and 38 may include additional components, such as counting-rate circuits and other conventional circuits. Amplifiers 36 and 38 both supply signals to addition circuit 40 where the signals are added to determine the total number of thermal neutrons detected during the entire timing cycle. It will be apparent from the foregoing discussion that such a total will have a relatively large value for nonporous formations, a relatively low value for any porous formation, and an extremely low value for porous formations containing salt water. Thus, this total is indicative of the porosity of the formations and is supplied by addition circuit 40 to porosity recorder 42 which records the total as a function of depth to provide a porosity log of the formations.

As indicated earlier, the thermal decay time of the formations is strongly affected by the chlorinity of the formations, and where the formations are porous, the chlorinity is of interest since it provides an indication of whether the pore spaces of the formation are filled with salt water, or are possible producing sources of oil, gas, or fresh water. Where the formations are nonporous, the chlorinity is of little, if any, interest. It has also been noted that the "out-of-phase" signal provides some indication of the thermal decay time, but is also affected, to some extent, by the slowing-down time required for neutrons emitted near the end of the "inphase" portion of the cycle to decay to thermal energies. On the other hand, it has been pointed out that in porous formations the slowing-down time is greatly reduced due to the large hydrogen content of porous formations. Thus, for porous formations the slowing-down time can be ignored, and the "out-of-phase" signal will provide a rough indication of the thermal decay time, and hence, the chlorinity of the formations. Consequently, if desired, the signal from "out-of-phase" amplifier 38 could be supplied directly to recorder 56 and could be recorded as a function of depth. Where the signal on porosity recorder 42 showed a formation to be porous, the operator could then consider the signal of recorder 56 to get an indication of the thermal decay time and could thereby determine the approximate chlorinity of the formations.

A much more accurate determination of the thermal decay time and, thus, the chlorinity of the formations can be obtained by subtracting the "out-of-phase" signal from the "inphase" signal and then dividing this difference by the sum of the signals which was determined, as described above, in obtaining the porosity log. This may be accomplished, with the apparatus of FIG. 1, by supplying the signals from "inphase" amplifier 36 and "out-of-phase" amplifier 38 to a subtraction circuit 44 and supplying the signals from addition circuit 40 and subtraction circuit 44 to normalizing circuit 54. Normalizing circuit 54 divides the signal from subtraction circuit 44 by the signal from addition circuit 40 and indicates the quotient on a suitable recorder 56 as a function of depth. This quotient is a function of the thermal decay time in porous formations and, consequently, permits the operator to accurately and reliably compute the chlorinity of such formations.

With the apparatus and method thus described, it will be found that for best results the modulating frequencies should be approximately equal to the midpoint of the expected range of thermal decay times. Thus, frequencies of the order of 1000 cycles per second can conveniently be employed for modulator 26. This means that the "inphase" and "out-of-phase" portions of the cycle may each be approximately 0.5 millisecond in duration. Since most accelerator-type neutron sources reach equilibrium conditions, that is, a constant rate of neutron emission, in a period of few microseconds and since the slowing-down time of most formations is also a matter of microseconds, modulating frequencies of the order of 1000 cycles per second tend to make these effects insignificant so that the resulting logs will not be influenced by these afctors. Moreover, modulating frequencies of this order provide counting rates which are about one-half or more of the counting rates which would be obtainable with a continuous source. In contrast, most of the prior art methods have employed irradiation periods of the order of a hundred microseconds or less and have encountered serious problems in obtaining meaningful counting rates. Counting rates as low as one-twentieth of the source flux are commonly encountered with such prior art systems, in contrast to the relatively high counting rates obtainable with the present invention. In addition, it should be noted, as shown in FIG. 1, that the subsurface equipment required for performing the method of the present invention is extremely simple and hence can be produced inexpensively and can be made rugged and virtually maintenance-free. Moreover, the method of the present invention is entirely compatible with detection systems employing pulse-height analysis techniques and consequently can be employed as a supplement to spectral analysis systems to provide additional information.

As indicated above, the normalization log, provided by recorder 56 of the apparatus of FIG. 1, permits an accurate determination of the chlorinity of porous formations. However, the theoretical basis for this log requires that the slowing-down time of the formations be small compared to the thermal decay time. This will be true for formations of moderate or high porosity due to the large hydrogen content of such formations, as discussed above. Unfortunately, in formations of low porosity the slowing-down time may become so large that it approaches the thermal decay time. When this condition exists, the accuracy of the thermal decay time, as determined from the normalization log of recorder 56 of FIG. 1, may be questionable. Since chlorinity is normally of interest only as an indication of salt water in porous formations, this condition may be tolerable since the thermal decay time log will be highly accurate in formations of moderate or high porosity, and the porosity is indicated by the porosity log of recorder 42 of FIG. 1.

Where it is necessary or desirable to know the thermal decay time accurately in formations of low porosity, the apparatus of FIG. 3 may be employed. The subsurface instrument of FIG. 3 differs from that of FIG. 1 only by the inclusion of a second detector 58 which is preferably insensitive to thermal neutrons, but detects epithermal neutrons; i.e., neutrons having energies above the thermal energy level. Detector 58 is positioned closer to source 16 than detector 18 and provides optimum results when spaced 6-to-9 inches from source 16. Detector 58 is also controlled by modulator 26 and switch 28 to provide an "inphase" signal to conductor 60 during periods when the source 16 is emitting neutrons and to provide an "out-of-phase" signal to conductor 62 during periods when the source 16 is not emitting neutrons. Since the slowing-down times of the formations will generally be less than 100 microseconds, the frequency employed by modulator 26, in this form of the invention, will preferably be of the order of 1000 cycles per second or more. The signals on conductors 60 and 62 are supplied to the signal-processing circuits 34 and are transmitted to the surface of the earth through the cable 4, in the same manner as described above for the signals from detector 18 of FIG. 1. At the surface, the signals from "inphase" conductor 60 are supplied to an "epithermal inphase" amplifier circuit 64, while the signals from "out-of-phase" conductor 62 are supplied to "epithermal out-of-phase" amplifier circuit 66. The amplifier circuits 64 and 66 correspond to the amplifier circuits 36 and 38 of FIG. 1 and may include counting-rate circuits, discriminator circuits, or other conventional electronic circuitry as described with respect to FIG. 1. From the amplifier circuits 64 and 66, the signals are supplied to an addition circuit 68 and a subtraction circuit 70 and these, in turn, supply sum and difference signals to normalizing circuit 72 which divides the difference by the sum in the same manner that the thermal neutron signals were treated in the method heretofore described with respect to FIG. 1 and supply the quotient to a suitable recorder 74 which records it as a function of depth.

From the normalization log of recorder 74, it is possible to compute the slowing-down time of the formations; i.e., the time during which the neutrons lost energy from the level at which they were emitted from the source 16 to the thermal energy level. The slowing-down time, as thus determined, may then be used to accurately compute the thermal decay time and chlorinity for formations of low porosity.

As a further alternative, the apparatus of FIG. 4 may be employed using a single detector 76, such as a scintillation counter which emits electrical signals indicative of the energy of the incident neutrons and which is sensitive to both thermal and epithermal neutrons. Detector 76 is preferably spaced from source 16 a distance of about 12 inches and, as shown, passes signals directly to the signal-processing circuits 34 for transmission through cable 4 to the surface of the earth. At the surface, discriminator means 78 receives the signals from detector 76 and separates the signals indicative of thermal neutrons from the signals indicative of epithermal neutrons. In this instance, switch 28 and modulator 26 are preferably located at the surface, and discriminator 78 passes the signals to switch 28 which supplies the signals to the appropriate amplifiers 36, 38, 64 and 66 which are identical to those of the apparatus of FIG. 3. Modulator 26 controls source 16, through the cable 4, from the surface. The balance of the surface equipment and the method of operation are the same as that of FIG. 3, and modulator 26 preferably employs a frequency of about 1000 cycles per second, as in the apparatus of FIG. 3.

Obviously, if desired, discriminator 78 and switch 28 could be included in the subsurface instrument between detector 76 and the signal-processing circuits 34. Moreover, with the apparatus of FIG. 3 separate modulating and switching means could be provided for the detectors 18 and 58 employing respective frequencies. In addition, numerous other variations and modifications may obviously be made without departing from the present invention. Thus, the output of a normalizing circuit can be applied to a feedback path to control the neutron source modulator 26 in order to optimize the pulse repetition rate and the duty cycle of the logging system. Accordingly, it should be clearly understood that the forms of the invention described above and shown in the figures of the accompanying drawings are illustrative only, and are not intended to limit the scope of the present invention.

What is claimed is:

1. A method of determining the characteristics of a substance; said method comprising the steps of irradiating said substance with high-energy neutrons during irradiation periods separated by nonirradiation periods, the duration of said irradiation and nonirradiation periods being substantially equal and significantly longer than the time required for the neutron source to reach equilibrium; detecting thermal neutrons; establishing a first electrical signal indicative of thermal neutrons detected during said irradiation periods; establishing a second electrical signal indicative of thermal neutrons detected during said nonirradiation periods; establishing a third electrical signal indicative of the sum of said first and second signals; establishing a fourth electrical signal indicative of the difference between said first and second signals; establishing a fifth electrical signal indicative of the quotient obtained by dividing said fourth signal by said third signal; and independently recording said third and fifth signals.

2. A method of determining the characteristics of a substance, said method comprising the steps of irradiating said substance with high-energy neutrons during irradiation periods of about 100 microseconds separated by nonirradiation periods of equal duration with said irradiation periods, detecting thermal neutrons, establishing a first electrical signal indicative of thermal neutrons detected during said irradiation periods, establishing a second electrical signal indicative of thermal neutrons detected during said nonirradiation periods, establishing a third electrical signal indicative of the sum of said first and second signals, establishing a fourth electrical signal indicative of the difference between said first and second signals, establishing a fifth electrical signal indicative of the quotient obtained by dividing said fourth signal by said third signal, and independently recording said third and fifth signals.

3. Apparatus for determining the characteristics of a substance, said apparatus comprising means for irradiating said substance with high-energy neutrons during periods of irradiation separated by periods of nonirradiation having durations substantially equal to the durations of said periods of irradiation, means for detecting thermal neutrons, means for establishing a first electrical signal indicative of thermal neutrons detected during said periods of irradiation, means for establishing a second electrical signal indicative of thermal neutrons detected during said periods of nonirradiation, means for establishing a third electrical signal indicative of the sum of said first and second signals, means for establishng a fourth electrical signal indicative of the difference between said first and second signals, means for establishing a fifth electrical signal indicative of the quotient obtained by dividing said fourth signal by said third signal, and means for independently recording said third and fifth signals.

4. Apparatus for determining the characteristics of a substance, said apparatus comprising an accelerator-type neutron source capable of irradiating said substance with high-energy neutrons, control means capable of turning said source ON and OFF to obtain irradiation periods separated by nonirradiation periods having substantially equal duration with said irradiation periods, a thermal neutron detector capable of establishing electrical signals in response to detection of thermal neutrons, first signal channel means, second signal channel means, switch means operable by said control means to pass signals from said detector to said first signal channel means during said irradiation periods and to pass signals to said second signal channel means during said nonirradiation periods, addition circuit means connected to receive signals from said first and second signal channel means and capable of establishing an electrical signal indicative of the sum of the signals received from said signal channel means, subtraction circuit means connected to receive signals from said first and second signal channel means and capable of establishing an electrical signal indicative of the difference between the signals received from said signal channel means, normalizing circuit means connected to receive signals from said addition circuit means and said substraction circuit means and capable of deriving an electrical signal indicative of the quotient obtained by dividing the signal from said substraction circuit means by the signal from said addition circuit means, and recorder means capable of independently recording the signals from said addition circuit means and the signals from said normalizing circuit means.

5. A method of determining the characteristics of a substance, said method comprising the steps of irradiating said substance with high-energy neutrons during irradiation periods separated by nonirradiation periods having durations substantially equal to the durations of said irradiation periods, detecting epithermal neutrons, establishing a first electrical signal indicative of epithermal neutrons detected during said irradiation periods, establishing a second electrical signal indicative of epithermal neutrons detected during said nonirradiation periods, establishing a third electrical signal indicative of the sum of said first and second signals, establishing a fourth electrical signal indicative of the difference between said first and second signals, establishing a fifth electrical signal indicative of the quotient obtained by dividing said fourth signal by said third signal, and recording said fifth signal.

6. Apparatus for determining the characteristics of a substance, said apparatus comprising means for irradiating said substance with high-energy neutrons during irradiation periods separated by nonirradiation periods having durations substantially equal to the durations of said irradiation periods, means for detecting epithermal neutrons, means for establishing a first electrical signal indicative of epithermal neutrons detected during said irradiation periods, means for establishing a second electrical signal indicative of epithermal neutrons detected during said nonirradiation periods, means for establishing a third electrical signal indicative of the sum of said first and second signals, means for establishing a fourth electrical signal indicative of the difference between said first and second signals, means for establishing a fifth electrical signal indicative of the quotient obtained by dividing said fourth signal by said third signal, and means for recording said fifth signal.

7. A method of determining the characteristics of a substance, said method comprising the steps of periodically irradiating said substance with nuclear radiations, detecting nuclear radiations emerging from said substance and resulting from said irradiation, establishing a first electrical signal indicative of radiations detected in time intervals during which said substance is being irradiated, establishing a second electrical signal indicative of radiations detected in time intervals during which said substance is not being irradiated, establishing a third electrical signal indicative of the sum of said first and second signals, establishing a fourth electrical signal indicative of the difference between said first and second signals, establishing a fifth electrical signal indicative of the quotient obtained by dividing said fourth signal by said third signal, and recording said fifth signal.

8. Apparatus for determining the characteristics of a substance, said apparatus comprising means for periodically irradiating said substance with nuclear radiations, means for detecting nuclear radiations emerging from said substance and resulting from said irradiations, means for establishing a first electrical signal indicative of radiations detected in time intervals during which said substance is being irradiated, means for establishing a second electrical signal indicative of radiations detected in time intervals during which substance is not being irradiated, means for establishing a third electrical signal indicative of the sum of said first and second signals, means for establishing a fourth electrical signal indicative of the difference between said first and second signals, means for establishing a fifth electrical signal indicative of the quotient obtained by dividing said fourth signal by said third signal, and means for recording said fifth signal.

9. A method of determining the characteristics of a substance, said method comprising the steps of irradiating said substance with high-energy neutrons during irradiation periods separated by nonirradiation periods of equal duration with said irradiation periods, detecting thermal and epithermal neutrons, establishing a first electrical signal indicative of thermal neutrons detected during said irradiation periods, establishing a second electrical signal indicative of thermal neutrons detected during said nonirradiation periods, establishing a third electrical signal indicative of the sum of said first and second signals, recording said third signal, establishing a fourth electrical signal indicative of the difference between said first and second signals, establishing a fifth electrical signal indicative of the quotient obtained by dividing said fourth signal by said third signal, recording said fifth signal, establishing a sixth electrical signal indicative of epithermal neutrons detected during said irradiation periods, establishing a seventh electrical signal indicative of epithermal neutrons detected during said nonirradiation periods, establishing an eighth electrical signal indicative of the sum of said sixth and seventh signals, establishing a ninth electrical signal indicative of the difference between said sixth and seventh signals, establishing a tenth electrical signal indicative of the quotient obtained by dividing said ninth signal by said eighth signal, and recording said tenth signal.

10. A method of determining the characteristics of a substance; said method comprising the steps of irradiating said substance with high-energy neutrons during irradiation periods separated by nonirradiation periods; detecting thermal neutrons; establishing a first electrical signal indicative of thermal neutrons detected during said irradiation periods; establishing a second electrical signal indicative of thermal neutrons detected during said nonirradiation periods; establishing a third electrical signal indicative of the sum of said first and second signals; establishing a fourth electrical signal indicative of the difference between said first and second signals; establishing a fifth electrical signal indicative of the quotient obtained by dividing said fourth signal by said third signal; and independently recording said third and fifth signals.

11. A method of determining the characteristics of a substance; said method comprising the steps of irradiating said substance with high-energy neutrons during irradiation periods separated by nonirradiation periods, the duration of said irradiation periods being substantially equal and significantly longer than the time required for the neutron source to reach equilibrium; detecting thermal neutrons; establishing a first electrical signal indicative of thermal neutrons detected during said irradiation periods; establishing a second electrical signal indicative of thermal neutrons detected during said nonirradiation periods; establishing a third electrical signal indicative of the sum of said first and second signals; establishing a fourth electrical signal indicative of the difference between said first and second signals; establishing a fifth electrical signal indicative of the quotient obtained by dividing said fourth signal by said third signal; and independently recording said third and fifth signals.

12. Apparatus for determining the characteristics of a substance, said apparatus comprising means for irradiating said substance with high-energy neutrons during periods of irradiation separated by periods of nonirradiation, means for detecting thermal neutrons, means for establishing a first electrical signal indicative of thermal neutrons detected during said periods of irradiation, means for establishing a second electrical signal indicative of thermal neutrons detected during said periods of nonirradiation, means for establishing a third electrical signal indicative of the sum of said first and second signals, means for establishing a fourth electrical signal indicative of the difference between said first and second signals, means for establishing a fifth electrical signal indicative of the quotient obtained by dividing said fourth signal by said third signal, and means for independently recording said third and fifth signals.

References Cited

UNITED STATES PATENTS 3,420,998   1/1969   Mills _____ 250—83.1 X

ARCHIE R. BORCHELT, Primary Examiner

U.S. Cl. X.R.

250—83.3, 83.6